Patented Oct. 28, 1941

2,260,819

UNITED STATES PATENT OFFICE 2,260,819

COATING COMPOSITION

Ladislaus Balassa, Flint, Mich., assignor to E. I. du Pont de Nemours & Company, Wilmington, Del., a corporation of Delaware No Drawing. Application November 25, 1939, Serial No. 306,100

7 Claims. (Cl. 106—14)

This invention relates to coating compositions for application to a metal surface and more particularly to a composition in which phosphoric acid is incorporated in a new and novel manner into an oil paint, varnish, or enamel. Heretofore, it has been proposed to add phosphoric acid to coating compositions for various purposes among which may be mentioned the prevention of gelling of certain metallic pigments, the prevention of discoloration of lacquer in metallic containers, the adhesion of certain resinous enamels to metals and the de-rusting of metallic surfaces.

In British Patent 3,119 of 1869, it has been proposed to add phosphoric acid to an oil varnish, but the results obtained by such a method are far inferior to those produced by the present invention.

Heretofore, when metal surfaces are to be finished, the metal is cleaned and any traces of wax or grease removed. A primer which has the property of adhering tenaciously to the metal is then applied and subsequently the decorative or top coats are added. There has always been considerable difficulty in effecting a secure and permanent bond between the decorative coat and the metal even when an especially designed primer is used next to the metal.

It is, therefore, an object of this invention to provide a primer or decorative coating composition which will adhere tenaciously and permanently to a metallic base. It is also an object of this invention to provide a coating composition which reduces the rate of corrosion of the metal to which it is applied.

A further object is to produce a composition which will adhere sufficiently strong to a metallic base that the metal may be bent or distorted without separation of the coating composition from the metal. Other objects will appear as the description of the invention proceeds.

These objects are accomplished by reacting phosphoric acid with a drying or semi-drying oil containing sufficient

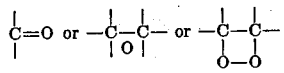

groups on their fatty acid chain as will be described more fully hereinafter.

In practicing my invention I first oxidize a drying oil such as linseed oil until a considerable amount of the above groups are produced. This may be done by any known method although the cheapest and simplest way is to blow the oils with air at a suitable temperature until the degree of oxidation is obtained. In the case of linseed oil I have found that this degree is obtained when blowing is continued until the oil has a viscosity of Z+1 Gardner-Holdt bubble viscosity standard, a color of 3+ Gardner-Holdt, an acid number of 4.05, an oxygen content of 16%, a saponification value of 241, an iodine number of 149 (Hanus method), and practically no metallic soaps. As an illustration of producing such an oil the following description is given.

The oil, preferably alkali refined linseed oil, is put in a kettle of aluminum, Monel metal or the like, which will not be materially attacked by the by-products of the operation. The contents are heated to 220–250° F., and a stream of air is bubbled through the oil by the use of a suitable apparatus well-known to the art of varnish making. The temperature should be kept constantly within a narrow range. With constant blowing, between 18–36 hours are required to reach the desired degree of oxidation. The process may be controlled by repeated observation of the iodine number of the batch or more simply by taking samples at regular intervals and testing them for "body" by the Gardner-Holdt tube method. When it reaches the desired body the blowing of air and the further heating of the batch should be discontinued. The total amount of oxygen taken up by the oil appears to be the measure of its suitability for the purpose of dispersing phosphoric acid. I prefer to use a U. S. P. grade syrupy phosphoric acid containing approximately 85% $H_3PO_4$.

The phosphoric acid is preferably added to the blown oil at room temperature. The mixture is stirred vigorously until a clear dispersion is obtained. In order to have a practical composition, the ratio of blown linseed oil to phosphoric acid should not be materially less than 100:1, i. e., the phosphoric acid should be present in amount greater than 1% of the blown oil but not substantially over 3% of the blown oil. It is to be understood, however, that even as low as 0.1% phosphoric acid shows some advantage over similar compositions with none present. On the other hand, as much as 16% phosphoric acid may be dissolved in linseed oil blown to a body of Z+1 and is useful for some purposes, especially if used within a day or so. When such a large amount of phosphoric acid is used, the compositions are less stable, and therefore, my preferred range is from 1 to 3%.

Examples of compositions successfully used for the purpose intended are:

|  | Example I | Example II | Example III |
|---|---|---|---|
| Blown linseed oil | 99.0 | 98.0 | 97.0 |
| Phosphoric acid | 1.0 | 2.0 | 3.0 |
| Mineral spirits | 100.0 | 100.0 | 100.0 |
|  | 200.0 | 200.0 | 200.0 |

The term "mineral spirits" designates clear colorless distillates obtained from petroleum and having a specific gravity of .789, a boiling range of 150–216° C., and a flash point of 100° C.

The phosphoric acid is stirred into the whole of the blown oil until it is taken up and a clear solution results. Some heat is evolved during this operation, presumably due to a partial polymerization or gellation of the blown linseed oil under the catalytic action of the phosphoric acid. This presumption is supported by the fact that the body of the mixture considerably increases during the operation. The evolution of heat stops, or at least becomes imperceptible, when all the phosphoric acid is taken up by the oil.

The product stays clear even after it is diluted with the solvents. I have found that, although I may use exclusively aliphatic hydrocarbons as solvents, the stability of the product is greatly increased if the solvent mixture includes a low percentage of aromatic hydrocarbons like xylol or hi-flash coal-tar naphtha. High solvency petroleum fractions or hydrogenated solvents are also satisfactory diluents for the blown oil phosphoric acid compositions.

I have found also that the stability, that is, the resistance against gellation and excessive bodying of the blown oil-phosphoric acid clears, is dependent more on the amount than on the type of solvents used. Compositions containing phosphoric acid in quantities sufficient to be effective for corrosion protective coatings tend to gel above the total solids of 60% while they retain their original mobility, even after prolonged storage, if the total solids are kept at or below 50%. The term "total solids" is intended to mean all the non-volatile ingredients of a composition which participate in the formation and form a part of the solid film.

As a precaution it is to be noted that if the solvent is not added to the blown oil-phosphoric acid composition, soon after the phosphoric acid has been taken up, the body of the composition increases steadily forming eventually a rubbery gel that is useless for coating purposes. The rate of gellation and the appearance of the gel is dependent on the following factors:

1. The type of blown oil used (linseed, fish, soya, etc.).
2. The body of the blown oil.
3. The oxygen content of the blown oil.
4. The ratio of phosphoric acid to blown oil.

I found that blown fish oil compositions tended to gel at a very rapid rate while blown soya bean oil compositions resisted gellation for a comparatively long time.

Compositions, as a rule, increased their bodies at the lowest rate if the oils were blown to the lowest body and had only the minimum oxygen content necessary to dissolve the amount of phosphoric acid to be introduced.

I found also that the rate of bodying is in direct ratio with the amount of phosphoric acid introduced into the composition. A few other examples of a more complex type where the blown oil is in combination with various resins, and in some cases with China-wood oil, are the following:

EXAMPLE IV

|  | Parts by weight |
|---|---|
| Varnish A | 70.0 |
| Phosphoric acid | 1.0 |
| Mineral spirits | 29.0 |
|  | 100.0 |

Stir phosphoric acid into varnish A, add mineral spirits. A clear dark brown solution is obtained

*Varnish A composition*

|  | Parts by weight |
|---|---|
| Ester gum | 12.5 |
| Blown linseed oil | 37.5 |
| Mineral spirits | 37.5 |
| Xylol | 12.5 |
|  | 100.0 |

The ester gum and blown linseed are heated to 280–300° F. with constant stirring until all the gum is dissolved in the oil. The solvents are then added.

EXAMPLE V

|  | Parts by weight |
|---|---|
| Varnish B | 70.0 |
| Phosphoric acid | 1.0 |
| Mineral spirits | 29.0 |
|  | 100.0 |

The phosphoric acid is stirred into varnish B, and the mineral spirits are then added

*Varnish B composition*

|  | Parts by weight |
|---|---|
| Indene resin (MP 150° C.) | 12.5 |
| Blown linseed oil | 37.5 |
| Mineral spirits | 37.5 |
| Xylol | 12.5 |
|  | 100.0 |

This composition is prepared in the same manner as varnish A.

EXAMPLE VI

|  | Parts by weight |
|---|---|
| Blown linseed oil | 49.5 |
| Phosphoric acid | .5 |
| Mineral spirits | 50.0 |
| Varnish C | 100.0 |
|  | 200.0 |

Stir phosphoric acid into the blown linseed oil until it is taken up and a clear solution results. Add mineral spirits, stir, then add varnish C and stir thoroughly.

*Varnish C composition*

|  | Parts by weight |
|---|---|
| Rosin | 14.40 |
| Calcium hydrate | .60 |
| China-wood oil | 35.00 |
| Mineral spirits | 50.00 |
|  | 100.00 |

The rosin, China-wood oil and calcium hydrate are placed in open kettle. The charge is then heated rapidly to 510–520° F. The heat is stopped but the charge temperature will rise to about 560–575° F. It is then cooled 2½ hours after which solvent is added. The varnish is then clarified by centrifuging.

EXAMPLE VII

| | Parts by weight |
|---|---|
| Blown linseed oil | 49.5 |
| Phosphoric acid | .5 |
| Mineral spirits | 40.0 |
| Xylol | 10.0 |
| Resin A | 100.0 |
| | 200.0 |

Prepare the same way as Example VI.

Resin A is a linseed oil modified glycerine-phthalate resin with a solids composition of 52% linseed oil and 48% glycerine-phthalate reduced with a combination of aliphatic and aromatic solvents. Resin A is manufactured in accordance with procedures well known to the art. This resin has total solids of 55%.

EXAMPLE VIII

| | Parts by weight |
|---|---|
| Blown soya bean oil | 49.5 |
| Phosphoric acid | .5 |
| Mineral spirits | 45.0 |
| Xylol | 5.0 |
| Resin A | 100.0 |
| | 200.0 |

This composition is prepared in the same way as that given in Example VI.

Resin A: see description under Example VII.

A very similar procedure to that in the examples cited above enabled me to combine various asphalts and ester gum with blown linseed oil. All these combinations possess excellent dispersing properties with the phosphoric acid treated oil.

If the blown linseed-phosphoric acid ratio is kept around 100:1, iron resinate or linoleate may be added without reducing materially the stability of the composition but enabling it to dry at even as low a temperature as 320° F. to a hard, glossy japan-like film. An addition of amino or phenolic inhibitors like phenyl-alpha-naphthylamine or creosol may be made to act as bake-equalizers or high boiling solvents for the protection of the films from dulling at temperatures over 450° F.

All these products may be pigmented with carbon black or other pigments inert to phosphoric acid. The pigments are preferably ground in the blown oil or with the varnish made out of the blown oil, the phosphoric acid being introduced into the liquid used for reducing the paste from the mill. As a typical example, the following may serve:

| | Parts by weight |
|---|---|
| Carbon black | 2.0 |
| Prussian blue | 3.0 |
| Blown linseed oil | 43.5 |
| Phosphoric acid (85%) | .5 |
| Mineral spirits | 6.0 |
| Hi-flash naphtha | 25.5 |
| Kerosene | 19.5 |
| | 100.0 |

The carbon black and the Prussian blue are ground in the ball mill with 13–15 parts of the blown linseed oil and some thinner. The phosphoric acid is dissolved in the rest of the blown linseed and the solution stirred into the well dispersed mill base. The solvents are stirred in at the last.

To obtain a higher gloss in the baked film, a small percentage of iron resinate and/or some phenyl-alpha-naphthylamine can be added.

The product made according to this example will give a thin, dense black, very adhesive primer coat or protective coat, when used alone on metal and baked at between 380–500° F. The film will also be reasonably free of the faults like silking, crawling, livering, flocculation of the pigments, etc., which are frequently encountered with protective coatings where the phosphoric acid has been introduced in a different manner.

This dispersion appears to be completely homogeneous and cannot be separated by settling or centrifuging, but yields phosphoric acid readily on water extraction.

Since drying oils such as linseed, and semi-drying oils such as soya-bean oil, when sufficiently blown, function according to the description of my invention to disperse phosphoric acid, at least to some extent, and since amounts of phosphoric acid even as low as ¼ of one per cent are useful in paints, I consider any blown drying or semi-drying oil with phosphoric acid in the manner and for the purposes described as being equivalents in my invention. While I prefer to use linseed oil that has been blown to body Z or Z+1 on the Gardner-Holdt scale, I may use those blown to a somewhat lower body such as body G, which are compatible with phosphoric acid.

The advantages of the present invention over known modes of incorporating phosphoric acid and derivatives in paints lies in its ability to flow out on large steel sheets, like auto fenders, and to dry to a glossy adhesive film, of very good appearance, and which gives good protection to the metal and serves as a good base for a high gloss enamel or other coats.

Another advantage is its stability regardless of heavy losses of the solvent and to the exposure in humid atmosphere and its ability to form stable mixtures with iron resinate.

A further advantage is the very slight degree of attack of metal containers by these solutions.

A still further advantage is that the treated blown oils are soluble in practically all paint thinners and varnish ingredients and that compositions prepared with treated oil have a marked reduction in their tendency to crawl. These compositions are also less reactive with metallic soaps and driers, and in this respect represent an improvement over the addition of phosphoric acid to the unblown oil. Another advantage is that when the phosphoric acid is combined with a blown oil it is unnecessary to use alcohols or other blending agents.

It is apparent that many widely different embodiments of this invention may be made without departing from the spirit and scope thereof, and therefore, it is not intended to be limited except as indicated in the appended claims.

I claim:

1. A coating composition comprising the reaction product at room temperatures of a blown oil having drying properties and from 1 to 3% phosphoric acid, a resin, and solvents, said reaction product having been dispersed in solvents before a rubbery gel is produced, the solids of the said composition being below about 50%.

2. The process of preparing coating compositions which comprises the improvement of mixing from 1 to 3% of phosphoric acid with 97 to 99% of blown linseed oil at room temperatures, and thereafter incorporating the clear reaction mixture with a solvent before a rubbery gel is produced, the solvent being present in amount sufficient to prohibit gel formation.

3. A coating composition comprising an oil varnish containing the reaction product of a blown oil having drying properties and from 1 to 3% of phosphoric acid based on the said oil, reacted at room temperatures, and diluted with at least an equal amount of a solvent after the phosphoric acid has dissolved but before a rubbery gel has been produced.

4. As a new composition of matter the reaction product at room temperatures of a blown drying oil and from 1 to 3% of orthophosphoric acid, dispersed in a solvent before a rubbery gel is produced, the solids of the said composition being below about 50%.

5. A coating composition comprising the reaction product at room temperatures of a blown oil having drying properties and 1 to 3% of phosphoric acid, dispersed in a solvent before a rubbery gel is produced, the solids of the said composition being below about 50%.

6. An article having a metallic surface and a dry tough film firmly adherent to the said metallic surface of a coating composition, comprising the reaction product at room temperatures of a blown oil having drying properties and from 1 to 3% of phosphoric acid dispersed in a solvent before a rubbery gel is produced.

7. In the process of preparing oleaginous coating compositions in which phosphoric acid is added thereto, the improvement which comprises mixing at room temperatures a blown oil having drying properties with from 1 to 3% thereof of phosphoric acid and mixing about an equal portion of solvent therewith after the phosphoric acid has been dissolved and before a rubbery gel has been produced.

LADISLAUS BALASSA.